Nov. 6, 1956  W. H. PURDIE ET AL  2,769,302
MEANS FOR SUPPLYING COMBUSTION AIR TO INTERNAL
COMBUSTION ENGINES
Filed Jan. 22, 1952  8 Sheets-Sheet 1
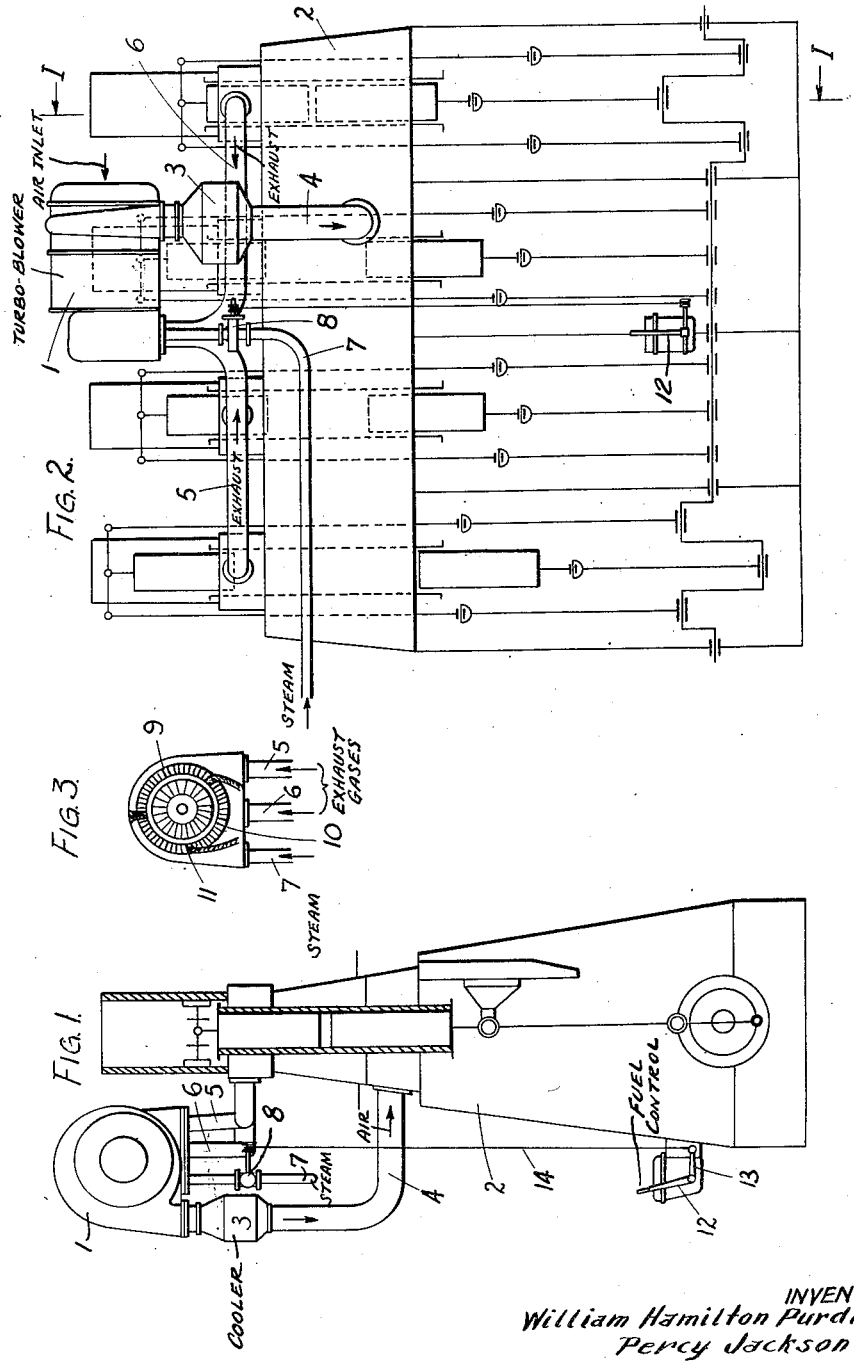
INVENTORS
William Hamilton Purdie &
Percy Jackson
BY
Hoopes Leonard & Glenn
ATTORNEYS

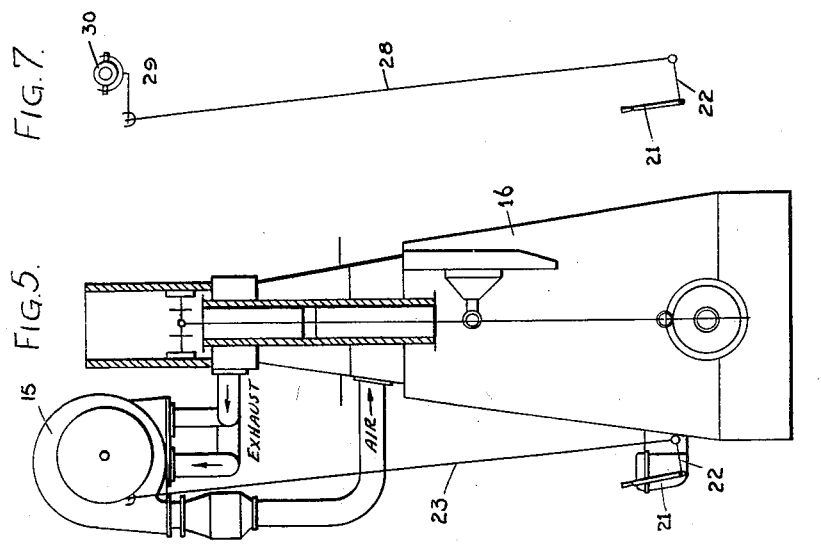
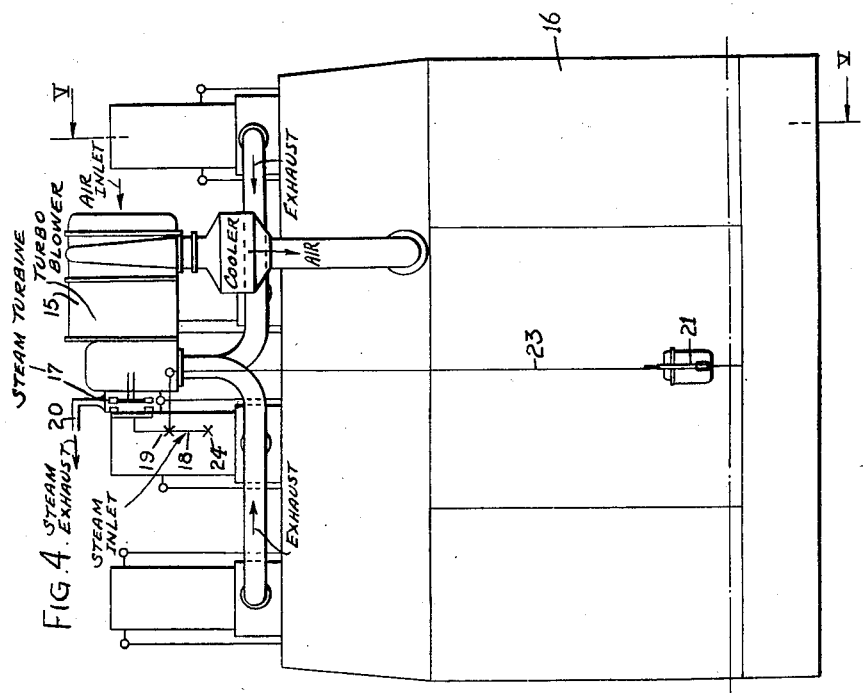

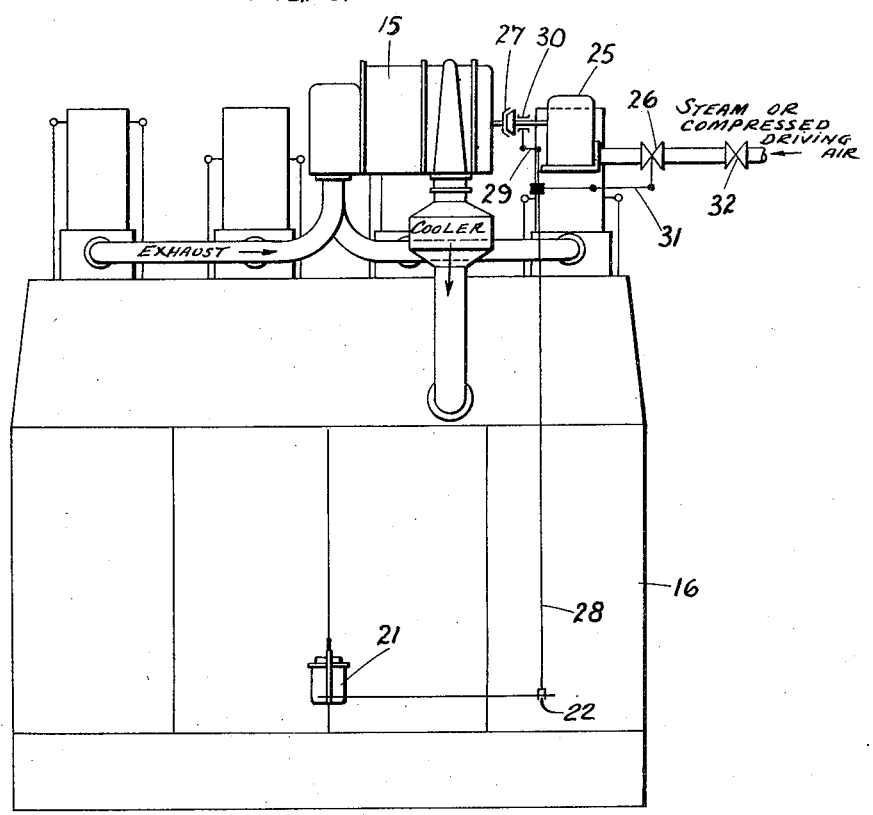

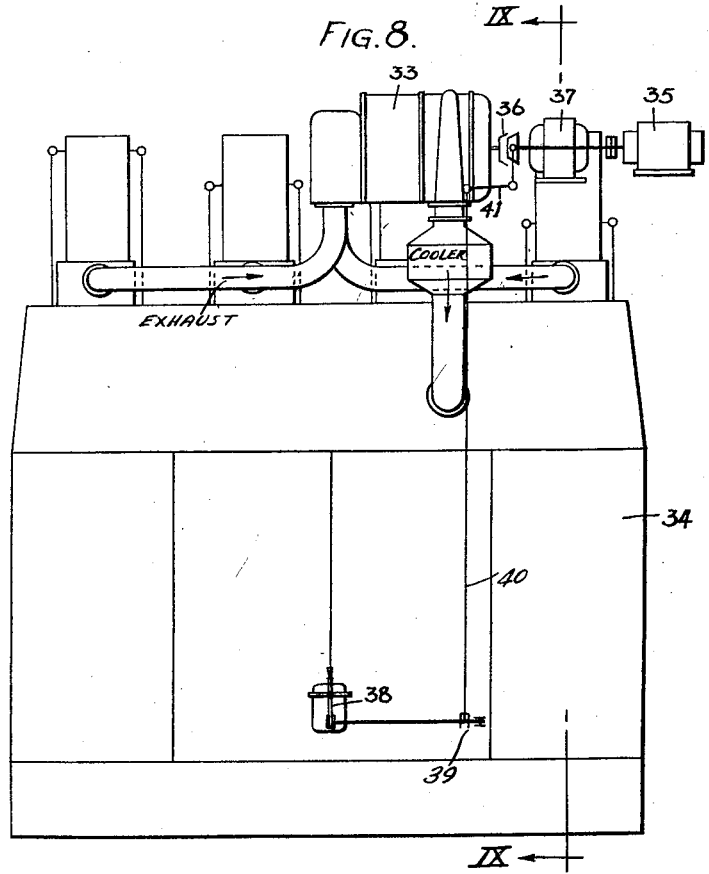

Nov. 6, 1956  W. H. PURDIE ET AL  2,769,302
MEANS FOR SUPPLYING COMBUSTION AIR TO INTERNAL
COMBUSTION ENGINES
Filed Jan. 22, 1952  8 Sheets-Sheet 5
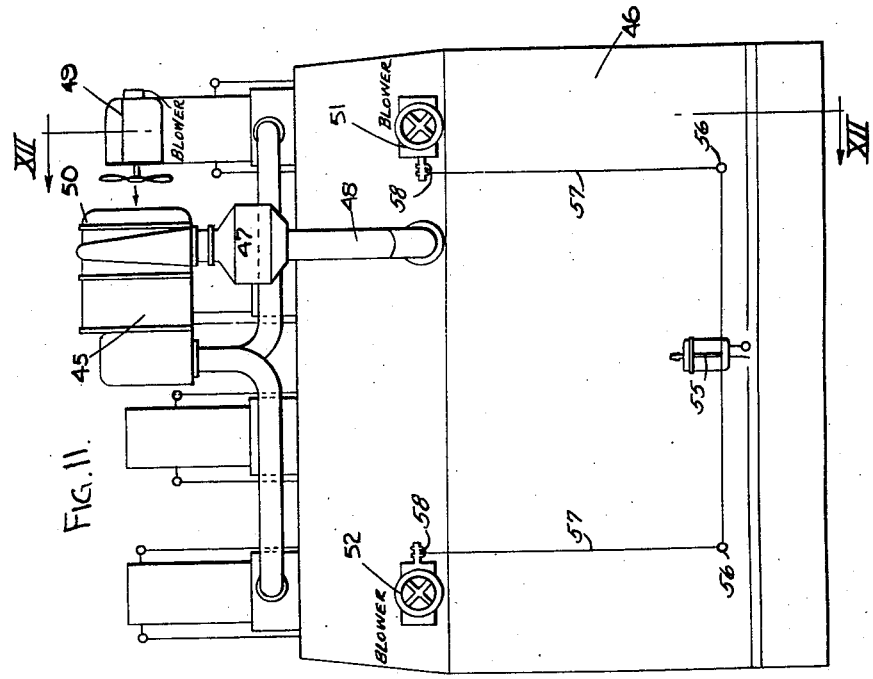
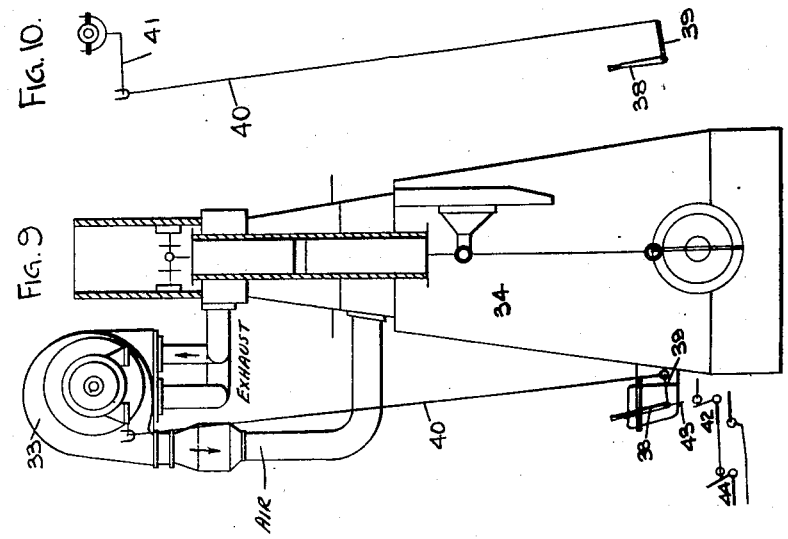
INVENTORS
William Hamilton Purdie &
Percy Jackson
BY
Hooper Leonard & Ginn
ATTORNEYS

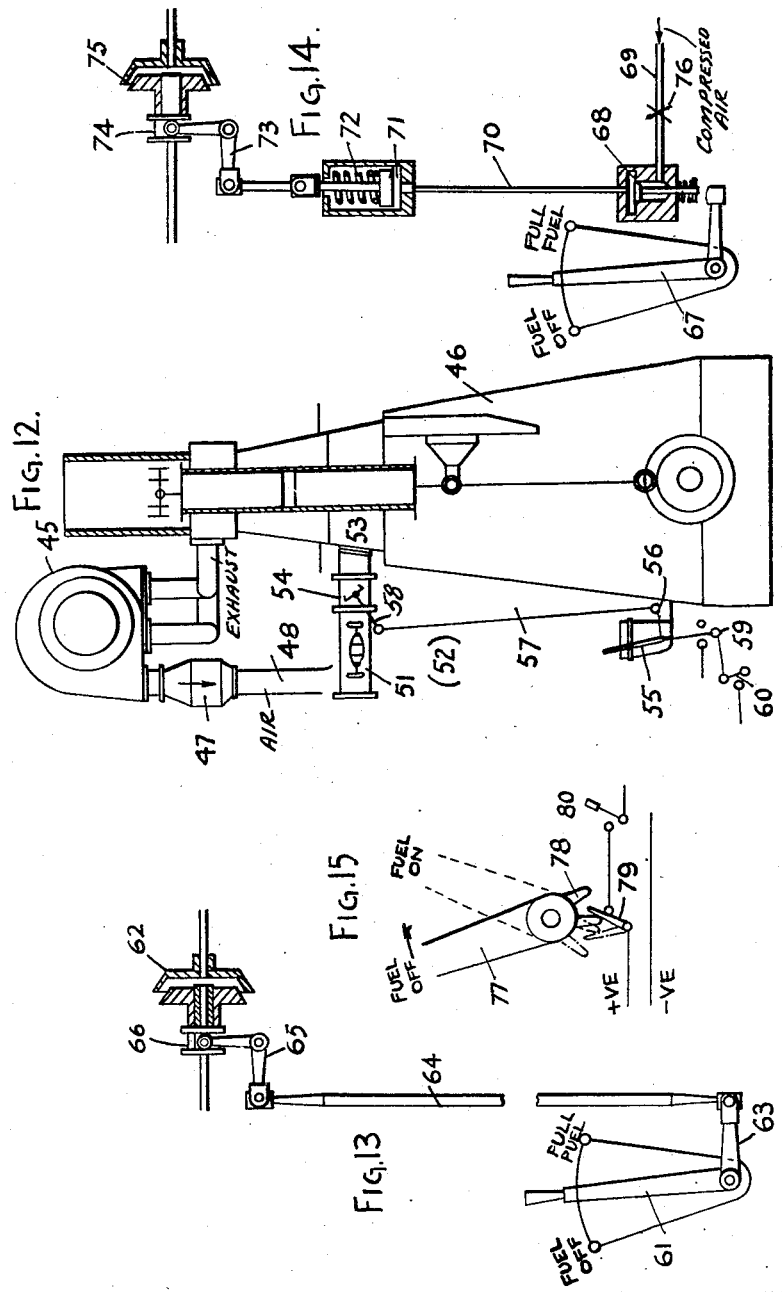

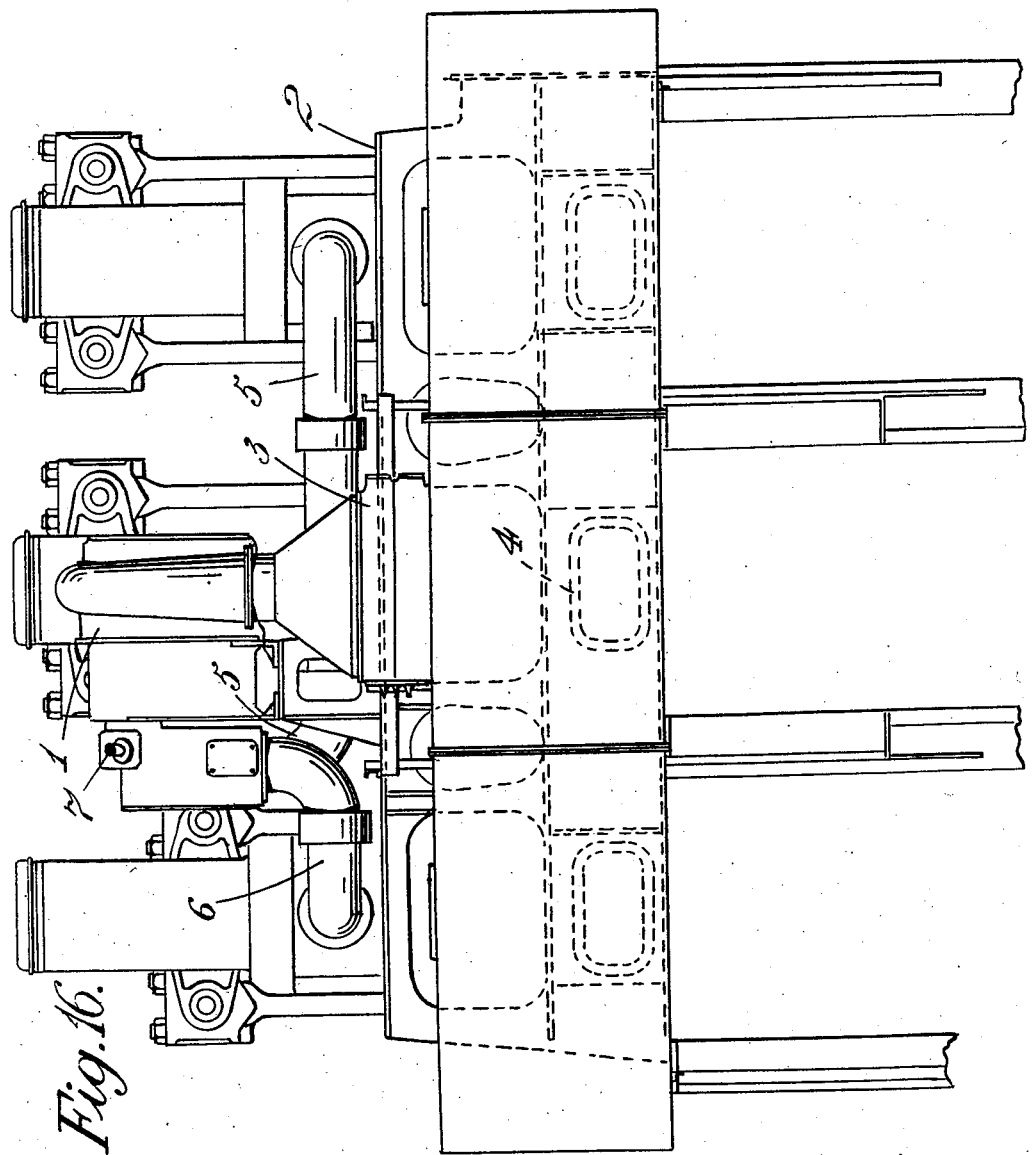

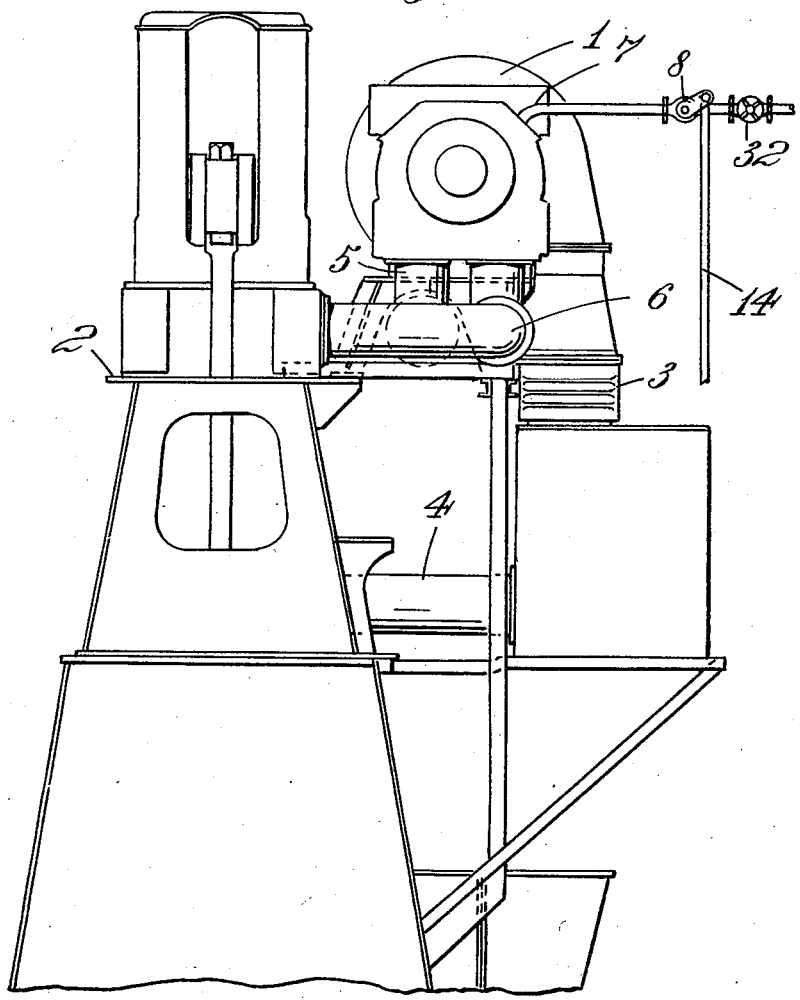

United States Patent Office 2,769,302
Patented Nov. 6, 1956

2,769,302

MEANS FOR SUPPLYING COMBUSTION AIR TO INTERNAL COMBUSTION ENGINES

William Hamilton Purdie and Percy Jackson, Sunderland, England, assignors to William Doxford & Sons Limited, Sunderland, England, a British company Application January 22, 1952, Serial No. 267,525

Claims priority, application Great Britain January 24, 1951

8 Claims. (Cl. 60—13)

The invention relates to internal combustion engines and is concerned with engines of the kind having an exhaust driven turbo-blower for supplying to the engine air under pressure for combustion (e. g. for supercharging) and for scavenging. The invention is particularly suitable for application to opposed piston two-stroke cycle diesel engines such as are commonly employed for the propulsion of ships.

It is necessary in engines of the above kind to provide additional means for supplying combustion and scavenging air during starting and slow running when the exhaust energy from the engine is insufficient to operate the turbo-blower. Previously an engine driven compressor has been provided for this purpose. It is an object of the invention to avoid the use of such an engine driven compressor.

According to the invention an internal combustion engine of the above kind is characterised by an arrangement whereby a source of power external to the engine is employed for supplying the scavenging air and the air for combustion during starting of the engine and/or when running at low speeds at which the exhaust energy is insufficient to drive the turbo-blower to produce the air required.

In a preferred form of the invention the external source of power is arranged to drive the turbo-blower. For example the turbo-blower may be driven by an air or steam blast directed on to the exhaust turbine or on to a separate turbine which is coupled to the blower. When compressed air is employed for this purpose it may be derived from a system in which air is stored for starting the engine. The compressed air may initially be derived from a compressor driven by the main engine or by an auxiliary engine or motor. Alternatively an electric motor may be employed to drive the turbo-blower and there may be included in the drive between the motor and the blower a releaseable clutch operated mechanically, pneumatically or magnetically.

The steam or air jets onto the turbine wheel of the turbo-blower may be arranged by providing a separate nozzle segment to which the steam or compressed air is supplied during starting and slow running and other segments of nozzles may be arranged in the same nozzle ring for use when the turbo-blower is driven from the exhaust gases of the various cylinders and these nozzle segments may be separated into two or more sections each being supplied with exhaust gas from one or more cylinders of the engine. Alternatively instead of the steam which is used for starting and slow running being directed onto the same turbine wheel and issuing from the same exhaust piping to which the exhaust gas is supplied there may be a separate turbine wheel mounted on the same shaft to which steam is supplied and this separate wheel may be arranged to lead the exhaust steam into a separate outlet pipe so that there may be no corrosion of the exhaust turbine wheel or piping from the action of the steam.

In another form of the invention the external source of power is arranged to drive a separate blower in series or in parallel with the exhaust driven blower. The separate blower may be driven by an electric motor, the steam turbine or an air turbine or motor and when it is arranged in series with the exhaust driven blower it may direct its output into the suction of the exhaust driven blower. Alternatively it may be connected to the air manifold of the engine. There may be two such blowers connected into the manifold at different points.

Some specific embodiments of engines according to the invention will now be described by way of example and with reference to the drawings of which Figures 1–15 are largely diagrammatic and in which:

Figure 1 represents a transverse section on the line 1—1 in Figure 2 of one form of engine, Figure 2 is a front view of the engine shown in Figure 1, Figure 3 illustrates the arrangement of the nozzle rings of the turbo-blower used in the engine shown in Figures 1 and 2, Figure 4 is a front view of an engine with a turbo-blower mounted over the engine, Figure 5 represents a transverse section on the line V—V in Figure 4 of the engine shown in Figure 4, Figure 6 represents an alternative arrangement to that shown in Figures 4 and 5, Figure 7 illustrates the control gear employed in the engine shown in Figure 6 for disengaging the clutch, Figure 8 is a front view of another form of engine with a turbo-blower mounted over the engine, Figure 9 is a transverse section on the line IX—IX of the engine shown in Figure 8, Figure 10 shows the control gear employed in the engine shown in Figures 8 and 9, for operating the clutch, Figure 11 represents a front view of yet another form of engine having a turbo-blower mounted on the top, Figure 12 is a transverse section on the line XII—XII of the engine shown in Figure 11, Figure 13 shows control gear employed in the engine shown in Figures 11 and 12 for operating the clutch by mechanical means, Figure 14 shows an alternative form of control gear for operating the clutch pneumatically, Figure 15 shows a further alternative form of control gear for operating the clutch electrically, Figure 16 is a rear view of an actual engine, and Figure 17 is an end view of the engine shown in Figure 16.

In each of the specific embodiments of the invention shown in the drawings the engine is a multi-cylinder two-stroke opposed piston diesel engine and constitutes the main engine for a ship. The engine has an exhaust driven turbo-blower of sufficient capacity to provide all the air required by the engine for combustion and scavenging during normal operation at load. The turbo-blower delivers air under pressure to effect supercharging of the engine under full load conditions. The external source of power employed in the first examples is capable of driving the rotor and blower at a speed of about half the normal speed for full load operation, the power required to drive the blower being about one-eighth of that needed for full load operation.

In the engine shown in Figures 1, 2 and 3 the turbo-blower 1 is mounted on one side of the body of the engine 2 and supplies air to the engine through the intercooler 3 and air pipe 4. During normal load running the exhaust gases from the engine are supplied to the turbo-blower through the pipes 5 and 6. For starting and slow running steam is supplied to the turbine through the steam pipe 7 and control valve 8. Referring to Figure 3 the turbine nozzle ring 9 is divided into three sections 9, 10 and 11 and sections 9 and 10 are supplied with exhaust gas from the engine through pipes 5 and 6 while steam may be supplied through pipe 7 to nozzle section 11. The valve 8 controlling the supply of steam to the nozzle section 11 is controlled from the engine control handle 12 via the lever 13 and rod 14 so that as the lever 12 is pushed over to increase the speed of the engine so the lever 13 and rod 14 shuts the valve 8 and stops the supply of steam to the turbine as the load on the engine increases. Movement in the opposite direction opens the steam valve 8 as the load on the engine is reduced.

Referring now to Figures 4 and 5, turbo-blower 15 is mounted on the engine 16 and this turbo-blower 15 has a steam turbine wheel 17 mounted on the end of the shaft of the turbo-blower. The steam wheel is supplied with steam through the pipe 18 and valve 19 and the steam from the wheel 17 is exhausted through the steam pipe 20. The steam valve 19 is controlled from the engine control handle 21 through the lever 22 and rod 23 so that as the speed of the engine increases the supply of steam to the turbine is shut off. To enable the steam turbine wheel to be controlled and run independently of the running of the engine there is a hand controlled steam valve 24. Figures 6 and 7 show an alternative arrangement to that just described in which, instead of the steam turbine wheel 17 and valves and pipes 18, 19 and 24, a separate steam or air motor 25 is provided controlled by a steam or air valve 26 and this separate steam or air motor 25 is coupled to the turbo-blower 15 through a clutch 27 which may be disengaged by the engine control lever 21 through the lever 22, rod 28, bell crank lever 29 and clutch operating sleeve 30. The arrangement for controlling the clutch is described in more detail later with respect to Figure 13. Connected to the same rod 28 there is a bell crank lever 31 controlling the steam or air valve 26. There is also an additional hand operated steam valve 32 so that the steam or air motor may be started up prior to the starting of the engine by opening the steam valve 32 and as the hand controlled lever 21 is pushed over to increase the load on the engine this automatically shuts off the supply of steam or air by the valve 26 and also disengages the clutch 27 connecting the steam or air motor to the turbo-blower 15.

Referring now to Figures 8, 9 and 10, a similar arrangement is shown where a turbo-blower 33 is mounted on an engine 34 but in this case an electric motor 35 is coupled to the turbo-blower through a clutch 36. A gear box 37 is interposed between the electric motor 35 and the clutch 36 so that the turbo-blower 33 runs faster than the electric motor 35. The clutch 36 is, in this example also, operated by the engine control handle 38 through the bell crank lever 39, connecting rod 40 and bell crank lever 41. The supply of electric current to the motor 35 may also be cut off by the engine control handle 38 by means of an electrical supply switch 42 being operated by the lever extension 43 so that as the engine control lever 38 is pushed over to increase the load on the engine 34 the supply of current to the electric motor 35 is cut off by the contact switch 42 and the clutch 36 is operated to disengage the electric motor 35 and gear box 37 from the shaft of the turbo-blower 33. This will prevent the electric motor 35 and gear box 37 being overspeeded as the turbo-blower 33 increases in speed with increase in power of the engine 34. There may also be a hand operated electrical switch 44 to enable the electric motor 35 to be started prior to the starting of the engine. Movement of the control lever 38 to reduce fuel will close the clutch 36 and switch 42 to start up the motor 35 as the engine speed falls.

Referring now to Figures 11 and 12 a turbo-blower 45 is mounted on an engine 46 and supplies air to the engine through the inter-cooler 47 and air pipe 48. To provide air for starting or slow running, a motor driven blower or fan 49 is provided to work in series with the turbo-blower 45. The motor driven fan 49 is arranged to supply air into the suction inlet 50 of the turbo-blower 45 and thus to supply air to the engine 46 prior to starting the engine and to increase the supply during slow running. In addition, or alternatively, two motor driven fans or blowers 51 or 52 are coupled directly to the air manifold 53 of the engine 46 to supply air in parallel with the turbo-blower 45. The blowers 51 and 52 are connected to the same air space 53 as the pipe 48 from the turbo-blower 45. Valves 54 are connected between the motor driven fans 51 and 52 and the air space 53 and these valves 54 may be controlled from the engine control lever 55 through the lever 56, connecting rod 57 and lever 58. The engine control lever 55 may also operate the electrical switch 59 so that as the control lever 55 is pushed over to increase the speed and load on the engine 46 the current to the motor driven fans 49 or 51 and 52 may be shut off as the speed of the turbo-blower 45 increases and the quantity of air which it delivers also increases. At the same time the valves 54 are closed to prevent the air from the air space 53 flowing back through the fans 51 and 52 as they are stopped. A hand operated electrical switch 60 may be provided to enable the electric motors 49 or 51 and 52 to be started prior to the movement of the lever 55, or stopped with lever 55 in the "Fuel Off" position.

Referring now to Figure 13 this shows in greater detail the mechanism indicated in Figures 6 and 10, for operating the clutch between the steam turbine, air motor or electric motor and the turbo-blower. As the engine control lever 61 is pushed over to increase the power and speed of the engine the clutch 62 is disengaged through the movement of the lever 63, push rod 64, bell crank lever 65 and clutch operating sleeve 66.

Figure 14 shows an alternative arrangement for operating the clutch pneumatically. As the engine control lever 67 is pushed over a valve 68 is permitted to close shutting off air supplied through the pipe 69 from supplying the pipe 70 and thus the air piston 71 will be pushed down by the spring 72 and will operate the bell crank lever 73 to move the clutch sleeve 74 and thus disengage the clutch 75. A hand control valve 76 may be provided in the air supply pipe 69 so that the clutch 75 may be pushed into engagement or may be disengaged when the control lever 67 is in the "Fuel Off" position.

Referring now to Figure 15 this shows in greater detail an arrangement for operating an electrical switch which controls a supply of current to an electric motor coupled to a turbo-blower or auxiliary fan as previously described. When the control lever 77 is pushed over the extension 78 operates the electrical switch 79 to cut off current from the starting motor and there may also be a hand operated switch 80 to permit the starting of the electric motor prior to the movement of the hand controlled lever 77. Similarly referring to Figures 13, 14 and 15 movement of the hand levers 61, 67 or 77 to reduce fuel will close the clutches or electric switches to start up the auxiliary drives.

Figures 16 and 17 show an actual engine according to the invention, the reference numerals used being those employed in the foregoing description.

The above examples have shown the application of the invention to opposed piston engines but it is also applicable to other two-cycle engines fitted with turbo-blowers for the supply of combustion or scavenging air for supercharging.

We claim:

1. An internal combustion engine having a manually operable control for the quantity of fuel supplied to the engine, a blower for supplying combustion air to the engine, a turbine wheel driven by the engine exhaust gases and coupled to the blower to effect operation thereof, additional power-producing driving means for the blower supplied from a source independent of the operation of the engine, a control for the power produced by said additional driving means and a coupling between the fuel control and the control for the additional power operative progressively to reduce the power produced with increase in the supply of fuel to the engine and progressively to increase the power produced when the fuel control is moved to decrease the supply of fuel to the engine.

2. An internal combustion engine as claimed in claim 1 in which the additional power-producing driving means comprise a nozzle for directing air on to the turbine wheel, and means for supplying air under pressure to the nozzle and the control for the additional power-producing driving means comprises a valve in the air supply.

3. An internal combustion engine as claimed in claim 1 in which the additional power-producing driving means comprise a nozzle for directing steam on to the turbine wheel, and means for supplying steam under pressure to the nozzle and the control for the additional driving means comprises a valve in the steam supply.

4. An internal combustion engine as claimed in claim 1 in which the additional power-producing driving means comprise a second turbine wheel which is also coupled to the blower to effect operation thereof, a source of gas under pressure independent of the exhaust gases and means for directing such pressure gas on to the second turbine wheel.

5. An internal combustion engine as claimed in claim 1 in which the additional power-producing driving means comprise a second turbine wheel coupled to the blower to effect operation thereof, a source of gas under pressure independent of the exhaust gases, means for directing such pressure gas on to the second turbine wheel, a clutch between the second turbine wheel and the blower having releasing means releasing the clutch and a coupling between the clutch releasing means and the manually operable means for controlling the quantity of fuel releasing the clutch upon operation of the control to increase the supply of fuel to the engine.

6. An internal combustion engine as claimed in claim 1 in which the additional power-producing driving means comprise an electric motor coupled to the blower and the control for the motor comprises an electric switch.

7. An internal combustion engine as claimed in claim 1 in which the additional power-producing driving means comprise an electric motor coupled to the blower and the control for the motor comprises an electric switch, a clutch between the motor and the blower with means for releasing the clutch and a coupling between the means releasing the clutch and the manually operable control for controlling the quantity of fuel releasing the clutch upon operation of the control to increase the supply of fuel to the engine.

8. An internal combustion engine having a manually operable control for the quantity of fuel supplied to the engine, blower means supplying air to the engine, said blower means being at least partially operable by engine exhaust gases and at least partially operable by power producing means independent of the operation of the engine, a control for the power output of said power producing means and a coupling between the fuel control and the power output control operative progressively to reduce the power produced when the fuel control is moved to increase the supply of fuel to the engine and progressively to increase the power produced when the fuel control is moved to decrease the supply of fuel to the engine.

References Cited in the file of this patent

UNITED STATES PATENTS

| | | |
|---|---|---|
| 2,036,989 | Büchi | Aug. 7, 1936 |
| 2,503,289 | Nettel | Apr. 11, 1950 |
| 2,608,054 | Price | Aug. 26, 1952 |

FOREIGN PATENTS

| | | |
|---|---|---|
| 288,217 | Great Britain | June 14, 1928 |
| 513,971 | Great Britain | Oct. 26, 1939 |
| 537,483 | Great Britain | June 24, 1941 |
| 620,376 | Great Britain | Mar. 23, 1949 |
| 684,902 | France | Mar. 24, 1930 |
| 160,008 | Switzerland | Apr. 17, 1933 |